Patented Mar. 19, 1929.

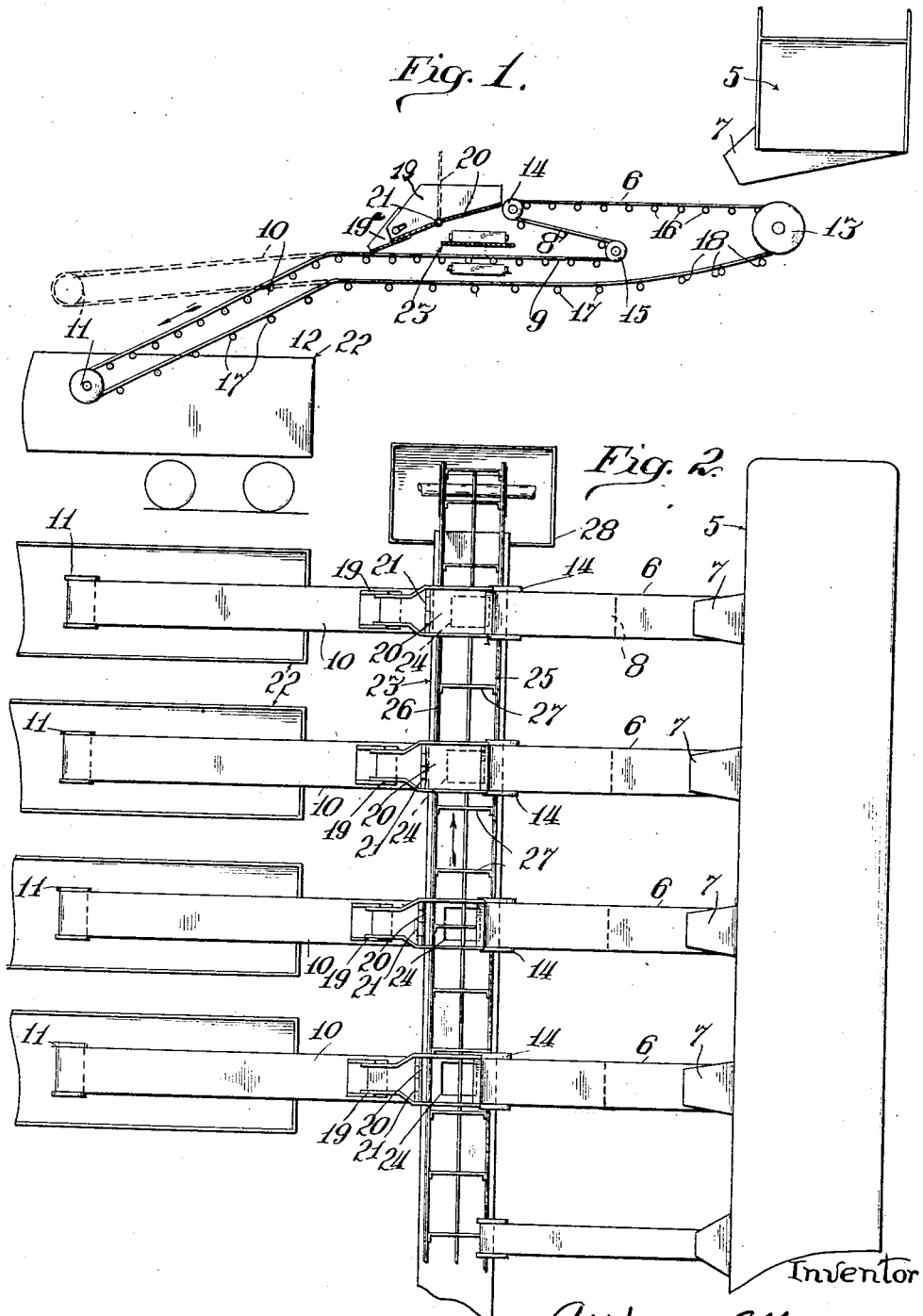

1,706,203

UNITED STATES PATENT OFFICE.

ANDREWS ALLEN, OF GLENCOE, ILLINOIS, ASSIGNOR TO ALLEN & GARCIA COMPANY, OF CHICAGO, ILLINOIS, A CORPORATION OF ILLINOIS.

MIXING CONVEYER.

Application filed September 15, 1926. Serial No. 135,559.

My invention relates to mixing conveyers such as are used at coal mines for grading and/or sizing coal as it comes from the mine, for the purpose of picking and then for remixing for delivery purposes.

The particular feature of my invention involves the use of an endless belt for one of the conveyers which belt is so arranged as to provide a picking table and also with a portion extending along a boom of the type which may be raised vertically for loading into cars.

An object of the invention is to provide a mixing conveyer in which coal or other material may be sized for picking purposes and then mixed for delivery purposes including an endless belt for providing the picking table and means for moving the mass along a delivery boom.
Another object is to provide a mixing conveyer comprising a plurality of individual conveyers, every conveyer comprising an endless belt, a portion of which serves as a picking table and another portion serves as means for moving the material along a boom for delivery purposes.

A further object of the invention is to provide a mixing conveyer comprising a plurality of endless belts, portions of which are adapted for use as picking tables and other portions of which are arranged along booms for delivery purposes, together with means for conveying material from one of such endless belts to another for grading or mixing.
A still further object of the invention is to provide a mixing conveyer having a single endless belt serving as a picking table and also as a boom conveyer element.

A yet further object of the invention is to improve mixing conveyers for generally successful commercial use.

Generally speaking, I carry out the preferred embodiment or my invention by providing a series of conveyers, every conveyer consisting of an endless belt disposed in such manner as to have a horizontal run for serving as a picking table and another run adapted to extend along a boom for delivery purposes; the boom being adjusted for vertical movement for loading the material into cars or other containers.

The above recited and other objects of my invention will be apparent from the following description and drawings and will be particularly pointed out in the appended claims.

In the drawings:

Fig. 1 is a diagrammatic representation in side elevation of the preferred embodiment of my invention, and

Fig. 2 is a top plan view, somewhat diagrammatic in arrangement, showing a mixing conveyer system made up of several of the conveyers of the invention.

In the drawings 5 represents diagrammatically a shaker screen of well known form which is adapted to receive the coal or other material as it comes from the mine and size the same over a series of screens provided with openings therein of various sizes. A mixing conveyer of my invention is made up of a plurality of endless belt members arranged substantially in the form shown in Fig. 1, having a portion of the upper run of said conveyer disposed in substantially horizontal position as at 6, for providing a picking table. The shaker screens 5 are adapted through chutes 7 to discharge sized material therefrom onto the picking tables 6 of the endless belts of my invention.

The belt is then turned back as at 8, forming an inactive run and then forwardly as at 9 substantially horizontally and over the boom 10, about the end thereof on a suitable roller support 11, back underneath the boom as at 12 and over an end roller 13 as shown. Suitably disposed rollers 14 and 15 are provided as shown for providing the portions 8 and 9 of the endless belt. Along the upper runs of the belt are provided a series of rollers 16 for supporting the belt as the same is moved from a source of power not shown, but in a manner well understood. Other rollers 17 are provided against which the under run of the belt bears in its travel, additional rollers 18 being provided near the end roller 13 for purposes well understood.

The boom portion of the conveyer, that is, that represented by the run of the conveyer 10 is a well known construction and is adapted for vertical movement so that the material loaded into a car may be loaded in a manner to prevent breakage thereof as far as possible. Suitable mechanism (not shown) may be employed for moving the boom vertically as desired.

For bridging the gap between the picking table fixed portion of the belt and the boom conveyer element 10, I provide a chute 19 having therein a hinged gate 20, hinged at 21 in any suitable manner. When the gate 20 is closed, the coal delivered onto the picking table 6 and moved therealong by movement of the belt, will pass over the chute 19 onto the boom conveyer element 10 and from the end thereof be loaded into the coal car 22 or other suitable receptacle. Disposed so as to underlie a plurality of such conveyers, is a steel plate 23 having underneath every one of the several conveyers, a grated opening 24. Along this plate operates a flight conveyer comprising longitudinally extending side members 25 and 26 made in the form of an endless conveyer, which side members are connected at intervals by cross members 27 which serve as scrapers along the plate 23 as the conveyer is operated in the direction of the arrow shown in Fig. 2.

In the operation of the mixing conveyer of the invention, coal or other material is delivered from the shaker screen 5 through the nozzles or spouts 7 onto the several picking table portions 6 of the several conveyers, sized in accordance with the particular portion of the shaker screen from which such material is delivered. While on the picking table portion 6 of the endless conveyer the coal is picked. Whenever it is desired to mix coal from one of the picking tables 6 with coal from any one of the other picking tables, the hinged gate 20 of the chute 19 is opened in the manner shown in dotted lines in Fig. 1, whereupon the coal will be delivered onto the flight conveyer disposed therebelow and moved in the direction of the arrow shown in Fig. 2, where it may be delivered on to the horizontal run 9 of any conveyer by opening the gate 24 of the particular conveyer desired, thus mixing coal from two or more of such endless conveyers. Coal so received on the horizontal portion 9 of the endless conveyer is delivered onto the boom conveyer element 10 and loaded into the cars 22 or other delivery receptacles.

The chute 19 is provided with a sliding end portion 19$^a$ so that the same may be moved backwardly to permit coal disposed on the horizontal run 9 of the conveyer from the flight conveyor 23 to pass thereunder and down the boom portion to the car 22.

If desired, another delivery receptacle such as a bin or hopper may be disposed at the end of the flight conveyer as indicated at 28. From this bin or hopper delivery may be made to a wagon, motor truck or car as desired.

While I have described more or less precisely the details of construction of my invention, I do not wish to be understood as limiting myself thereto as I contemplate changes in form and the proportion of parts and substitution of equivalents as circumstances may suggest or render expedient without departing from the spirit of my invention.

I claim:

1. A mixing conveyer including an endless belt arranged to provide a table to receive material thereon from a source of supply and a delivery portion, the belt being disposed with its upper run diverted at the end of the table portion out of the plane thereof and out of the plane of the delivery portion thus forming a gap in the direction of movement of the mass, a chute bridging said gap adapted to deliver the mass from the table portion to the delivery portion of the conveyor, said chute having a gate therein, a second conveyer disposed in angular relation to said first conveyor and arranged below said gate, and means for delivering material from said second conveyer onto the delivery portion of said first conveyer.

2. A mixing conveyer including in combination, an endless belt having a carrying run interrupted in continuity by diverting back a part thereof to form a gap in the direction of movement of the mass carried thereon, a chute bridging said gap, said chute including a gate, and a second conveyer disposed in angular relation to said first conveyer and underlying said chute for receiving material when the gate is open for delivery elsewhere.

3. A mixing conveyer including in combination, an endless belt having a carrying run interrupted in continuity by diverting back a part thereof to form a gap in the direction of movement of the mass carried thereon, a chute bridging said gap, said chute including a gate, and a second conveyer disposed in angular relation to said first conveyer for receiving material when the gate is open for delivery elsewhere, said second conveyer being disposed over a part of said first conveyer underneath said chute, and means for delivering material from said second conveyer onto said first conveyer at the junction thereof.

4. In an apparatus of the class described, including a plurality of endless conveyers in parallel relation, said conveyers having portions thereof forming delivery portions and table portions the table portions being adapted to receive material thereon from a source of supply, said delivery portions being adapted for bodily vertical movement, said conveyers being disposed to form gaps in the paths of movement thereof, chutes having gates therein bridging said gaps, and a single conveyer arranged in angular relation with respect to said plurality of conveyers and disposed to underlie said chutes for receiving material delivered through the gates thereof, and means for delivering material from said single conveyer onto any of the delivery portions of said successive conveyers of said plurality of conveyers, in the direction of movement of said single conveyer, for mixing and loading purposes.

5. In an apparatus of the class described, a plurality of similar conveyers each comprising a receiving portion and a delivery portion, means for distributing material to the receiving portions of the several conveyers, and means interposed between the receiving and delivery portions of each conveyer for diverting material from that conveyer to another conveyer of the series.

6. In an apparatus of the class described, a plurality of similar conveyers each comprising a receiving portion and a delivery portion, means for distributing material to the receiving portions of the several conveyers, and means interposed between the receiving and delivery portions of each conveyer for alternatively directing the material from the receiving portion to the delivery portion of the conveyer or diverting the material to another conveyer of the series.

7. In an apparatus of the class described, a plurality of similar conveyers each comprising a receiving portion and a delivery portion, means for distributing material to the receiving portions of the several conveyers, and means interposed between the receiving and delivery portions of each conveyer for alternatively directing the material from the receiving portion of that conveyer to the delivery portion of that conveyer or to the delivery portion of one of the other conveyers.

8. In an apparatus of the class described, a plurality of similar conveyers each comprising a receiving portion and a delivery portion, means for distributing material to the receiving portions of the several conveyers, and means interposed between the receiving and delivery portions of each conveyer for diverting material from the receiving portion of one conveyer to the delivery portion of another conveyer of the series.

9. In an apparatus of the class described, a plurality of similar endless conveyers disposed in substantially parallel relation, the load-carrying run of each conveyer comprising a receiving portion and a delivery portion positioned at a lower level, means for distributing material to the receiving portions of the several conveyers, a movable chute for each conveyer for directing material from the receiving portion to the delivery portion thereof, and means for transferring material from the receiving portion of one conveyer to the delivery portion of one of the other conveyers.

10. In an apparatus of the class described, a plurality of similar endless conveyers disposed in substantially parallel relation, the load-carrying run of each conveyer comprising a receiving portion and a delivery portion positioned at a lower level, means for distributing material to the receiving portions of the several conveyers, a movable chute for each conveyer for directing material from the receiving portion to the delivery portion thereof, and a conveyer disposed transversely of the series of conveyers for receiving material from any receiving portion when the corresponding chute is moved to inoperative position.

11. In an apparatus of the class described, a plurality of similar endless conveyers disposed in substantially parallel relation, the load-carrying run of each conveyer comprising a receiving portion and a delivery portion positioned at a lower level, means for distributing material to the receiving portions of the several conveyers, a movable chute for each conveyer for directing material from the receiving portion to the delivery portion thereof, and a conveyer disposed transversely of the series of conveyers for receiving material from any receiving portion when the corresponding chute is moved to inoperative position, said latter conveyer being provided with discharge openings for delivering material to the delivery portions of other conveyers in the series.

12. In an apparatus of the class described, an endless conveyer the load-carrying run of which comprises a receiving portion and a delivery portion disposed at a lower level, a chute for directing material from the receiving portion to the delivery portion, a part of the chute being movable to an inoperative position so that it does not receive the material from the receiving portions, and a second endless conveyer disposed beneath the movable portion of the chute for receiving the material when the chute is inoperative.

13. In an apparatus of the class described, a plurality of similar endless conveyers disposed in substantially parallel relation, the load carrying run of each conveyer being diverted so as to form an upper receiving portion and a delivery portion disposed at a lower level, means for distributing material to the receiving portions of the several conveyers, a chute for each conveyer for directing material from the receiving portion thereof to the delivery portion, part of each chute being movable to an inoperative position, a receiving plate disposed transversely of the several conveyers beneath the movable portions of the chutes and above the delivery portions of the conveyers, a plurality of gated openings in said plate one over each conveyer, and means for sliding material along the plate so that it may be discharged through any selected opening.

14. In an apparatus of the class described, a plurality of similar endless conveyers disposed in substantially parallel relation, the load carrying run of each conveyer being diverted so as to form an upper receiving portion and a delivery portion disposed at a lower level, means for distributing material to the receiving portions of the several conveyers, a chute for each conveyer for directing material from the receiving portion thereof to the delivery portion, part of each chute being movable to an inoperative position, a receiving plate disposed transversely of the several conveyers beneath the movable portions of the chutes and above the delivery portions of the conveyers, a plurality of gated openings in said plate one over each conveyer, and a flight conveyer movable along the plate for sliding material thereon and discharging same through any selected opening.

ANDREWS ALLEN.

CERTIFICATE OF CORRECTION.

Patent No. 1,706,203.  Granted March 19, 1929, to

ANDREWS ALLEN.

It is hereby certified that error appears in the printed specification of the above numbered patent requiring correction as follows: Page 2, line 12, for the word "grated" read "gated"; and that the said Letters Patent should be read with this correction therein that the same may conform to the record of the case in the Patent Office.

Signed and sealed this 16th day of April, A. D. 1929.

(Seal)

M. J. Moore,
Acting Commissioner of Patents.